(12) United States Patent
Milosevic et al.

(10) Patent No.: US 6,781,965 B1
(45) Date of Patent: Aug. 24, 2004

(54) METHOD AND APPARATUS FOR ECHO CANCELLATION UPDATES IN A MULTICARRIER TRANSCEIVER SYSTEM

(75) Inventors: Milos Milosevic, Austin, TX (US); Peter R. Molnar, Austin, TX (US); Takao Inoue, Austin, TX (US); Matthew A. Pendleton, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/543,866

(22) Filed: Apr. 5, 2000

Related U.S. Application Data

(63) Continuation-in-part of application No. 09/438,619, filed on Nov. 12, 1999.

(51) Int. Cl.[7] .............................................. H04B 3/20
(52) U.S. Cl. ..................................................... 370/286
(58) Field of Search ................................ 370/286–290, 370/350; 375/222, 350, 229–232, 346, 125; 379/410, 406.09; 407/406.01, 406.04, 406.05, 406.08, 406.07, 390.01–390.04; 725/111, 125

(56) References Cited

U.S. PATENT DOCUMENTS

| 4,672,638 A | * | 6/1987 | Taguchi et al. ............. 375/346 |
| 5,317,596 A |   | 5/1994 | Ho et al. ....................... 375/14 |
| 5,410,595 A |   | 4/1995 | Park et al. .................... 379/410 |
| 5,521,908 A | * | 5/1996 | Younce et al. ............... 370/286 |
| 5,687,229 A | * | 11/1997 | Sih ............................... 379/410 |
| 5,742,527 A |   | 4/1998 | Rybicki et al. ........ 364/705.05 |
| 5,909,463 A |   | 6/1999 | Johnson et al. ............. 375/220 |
| 6,160,886 A | * | 12/2000 | Romesburg et al. .... 379/406.05 |
| 6,219,418 B1 | * | 4/2001 | Eriksson et al. ............ 379/407 |
| 6,353,629 B1 | * | 3/2002 | Pal .............................. 375/222 |
| 6,421,377 B1 | * | 7/2002 | Langberg et al. ........... 375/222 |
| 6,570,986 B1 | * | 5/2003 | Wu et al. ............... 379/406.09 |

* cited by examiner

*Primary Examiner*—Chi Pham
*Assistant Examiner*—Prenell Jones

(57) ABSTRACT

A simple fast and robust echo canceller for both synchronous and asynchronous multicarrier transceiver systems. A first residual time domain echo component is separated from a receive signal in a first frame and a second residual time domain echo component is separated from a receive signal in the next consecutive frame. The first and second residual time domain echo components from consecutive frames are combined to obtain a combined residual time domain echo component. The combined residual time domain echo component is used to adaptively update coefficients in a transfer function representing an estimate of the echo channel in the multicarrier transceiver system. The separation of the echo components from the receive signal eliminates dependence on the receive signal so that convergence is substantially faster and not signal dependent. Performance of the echo canceller is virtually independent of the receive signal and allows reliable tracking of changes in the echo channel over time.

17 Claims, 4 Drawing Sheets

METHOD AND APPARATUS FOR ECHO CANCELLATION UPDATES IN A MULTICARRIER TRANSCEIVER SYSTEM

CROSS REFERENCE TO RELATED APPLICATIONS

The present invention is a continuation in part of U.S. patent application Ser. No. 09/438,619 entitled "Method and Apparatus for Echo Cancellation Updates in a Multicarrier Transceiver System," filed Nov. 12, 1999, which is hereby incorporated by reference herein in its entirety.

FIELD OF THE INVENTION

This invention relates generally to communication systems, and more particularly to echo cancellation in multicarrier transceiver systems.

BACKGROUND OF THE INVENTION

In order to make high data rate interactive services such as video and internet access available to more residential and small business customers, high-speed data communications paths are required. Although fiber optic cable is the preferred transmission media for such high data rate services, it is not readily available in existing communication networks and the expense of installing fiber optic cabling is prohibitive. Current telephone wiring connections, which consist of copper twisted-pair media, were not originally designed to support the data rates or bandwidth required for Interactive services such as video on demand or even high speed internet connections. Asymmetric Digital Subscriber Line (ADSL) technology has been developed to increase the effective bandwidth of existing twisted-pair connections, allowing interactive services to be provided without requiring the installation of fiber optic cable.

Discrete multi-tone (DMT) is a multicarrier technique used in multicarrier transceiver systems that divides the available bandwidth of twisted-pair copper media connections into mini-subchannels or bins. The DMT technique has been adopted in the American National Standards Institute (ANSI) T1.413-1998 standard (ADSL standard) and internationally, by the International Telecommunications Union, such as G.DMT (G.992.1) and G.Lite (G.992.2). In the ADSL standard, DMT is used to generate up to 250 separate 4.3125 kilohertz (kHz) subchannels from 26 kHz to 1.1 megahertz (MHz) for downstream transmission to an end user. Likewise, DMT is used to generate 26 subchannels from 26 kHz to 138 kHz for upstream transmission by an end user. The asymmetric transmission protocol implemented by the ADSL standard generally has a higher rate of data transmission from a central office to a remote terminal and a lower rate of data transmission from a remote terminal to a central office. As a result, different processing sequences are required at the remote terminal and central office ends.

One of the problems that ADSL systems must address is the problem of echo. Echo occurs when the frequency spectra of the upstream and downstream signals overlap. Such overlapping spectra are possible in some implementations of ADSL. However, it is possible to cancel some or most of this echo by using digital signal processing (DSP) techniques. Using this technique the transmit signal which causes the echo is used to estimate the echo component of a receiver's input signal. This estimated echo component is then subtracted from the receiver's input signal to form an estimate of the true far-end signal.

These systems conventionally have a training period at startup during which the characteristics of the channel are modeled. More sophisticated systems not only perform training at startup, but also adapt the coefficients continually. This adaptive echo cancellation allows for changes in parameters over time. For example, as transmission takes place a transmission line coupler will typically heat up. The result of this heating is that its characteristics change, so that the coefficients developed during the training period may no longer accurately cancel the echo.

In particular, the adaptation is made difficult by the fact that the coefficient update will be performed using the sum of the echo and the far-end signal. Over sufficiently long periods of time, the average value of the receive signal will be approximately zero, and thus the adaptation will be carried out using only the echo component of the signal. However, the receive signal only averages to zero over a relatively long period of time. Furthermore, there may be a bias in the receive signal such that the average value is not truly equal to zero. Thus it would be desirable to perform the coefficient update of an echo canceler based on only the echo signal, without the receive signal. Such an apparatus and method is provided by the present invention, whose features and advantages will be more clearly understood from the following detailed description taken in conjunction with the accompanying drawings.

DETAILED DESCRIPTION OF A PREFERRED EMBODIMENT

Figure 1:
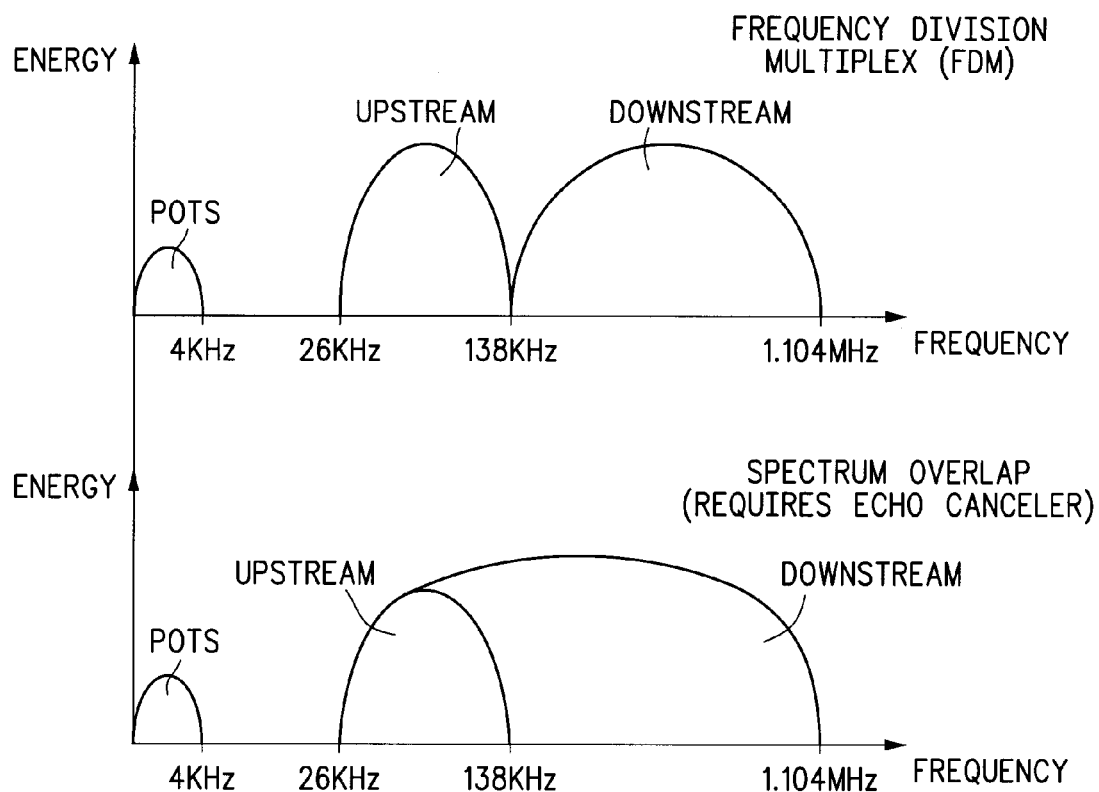
FIG. 1 illustrates, in graphical form, the frequency spectra of two alternative implementations of the ADSL standard.

FIG. 1 illustrates, in graphical form, the frequency spectra of two alternative implementations of the ADSL standard. In the graphs of both implementations, the vertical axis represents energy and the horizontal axis represents frequency. The first graph represents the frequency division multiplex (FDM) option of the ADSL standard. In this option, the lowest end of the frequency spectrum is used for ordinary voice telephone transmission and reception (POTS). This use of the spectrum takes place in the frequency range of between 0 and 4 kHz. Since the ADSL system is asymmetric, there is a different frequency requirement between the upstream and the downstream channels. Thus, the upstream channel occupies the frequency spectrum between 26 kHz and 138 kHz, whereas the downstream channel occupies the frequency spectrum of between 138 kHz and 1.104 MHz. Using this option, there is no need for echo cancellation, and the upstream and downstream signals may be separated by ordinary filtering.

Shown below the FDM frequency spectrum is the spectrum overlap option, in which the upstream and downstream channels overlap. As before, the POTS spectrum occupies the band between 0 and 4 kHz. However, the upstream and downstream spectra overlap. The upstream channel still occupies the frequency band between 26 kHz and 138 kHz.

However using this option, the downstream channel occupies a spectrum that overlaps the upstream spectrum, between 26 kHz and 1.104 MHz. The advantage of this option is that the spectrum may be utilized more efficiently. However, it also requires both the remote terminal and the central office transceivers to implement echo cancellation to receive the correct data.

Figure 2:
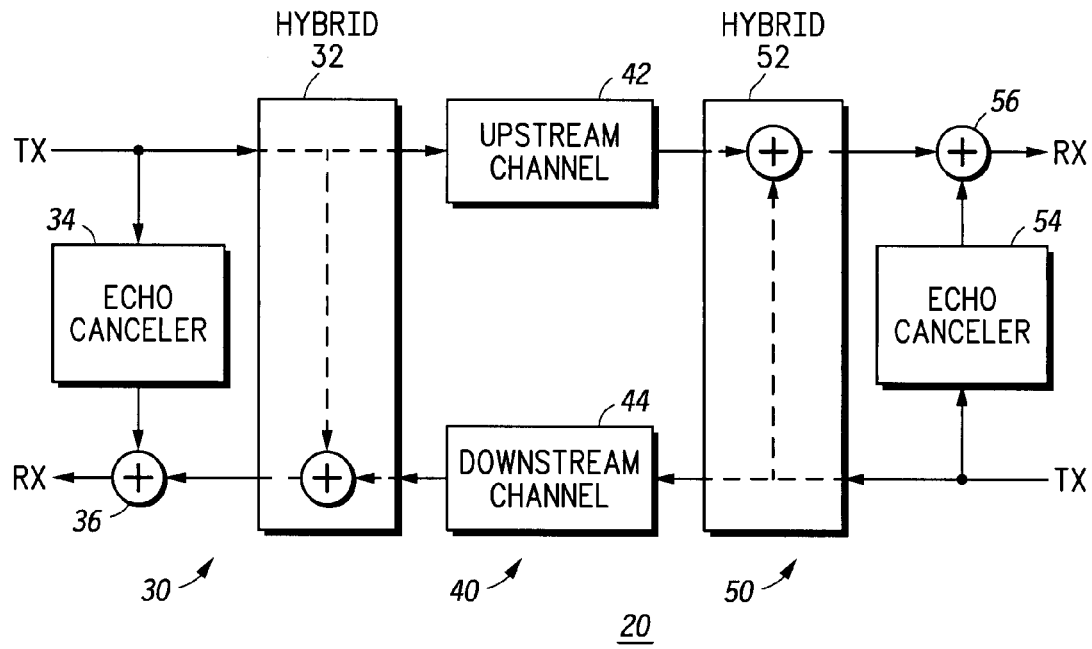
FIG. 2 illustrates, in block diagram form, a transceiver system using an adaptive echocanceler in accordance with the present invention.

FIG. 2 illustrates, in block diagram form, an ADSL system 20 according to the present invention. ADSL system 20 is a multicarrier transceiver system that includes generally a remote terminal (RT) multicarrier transceiver 30 and a central office (CO) multicarrier transceiver 50 that communicate via a transmission line 40. As illustrated in FIG. 2, transmission line 40 includes an upstream channel 42 and a downstream channel 44. However, it should be appreciated that these channels are broken out for the purposes of understanding the present invention and are actually co-existent on a single twisted pair transmission line.

RT transceiver 30 includes a transmission line hybrid 32, an echo canceler 34, and a summing device 36. Hybrid 32 connects the four wires formed by the two-wire transmit signal path and the two-wire receive signal path into one twisted pair transmission line 40. Echo canceler 34 has a signal input for receiving a transmit signal labeled "TX", and an output. Summing device 36 has a positive input terminal connected to the output of hybrid 32, a negative input terminal coupled to the output of echo canceler 34, and an output terminal for providing a receive signal labeled "RX".

Note that hybrid 32 reflects a portion of the transmit signal back into the receive path as is illustrated by the dash lines in FIG. 2. This represents a near end echo component of the echo. In addition, a corresponding hybrid 52 in CO transceiver 50 also causes echo between the transmit signal and the receive signal as seen from RT transceiver 30, not illustrated in FIG. 2. Thus both these sources of echo are represented in the positive input to summing device 36. In an ideal system, echo canceler 34 would completely cancel out both of these components of echo; in non-ideal systems, a significant amount would remain.

CO transceiver 50 includes hybrid 52, an echo canceler 54, and a summing device 56. Hybrid 52 separates one twisted pair transmission line 40 into a two-wire transmit signal path and a two-wire receive signal path. Echo canceler 54 has a signal input for receiving a transmit signal labeled "TX", and an output. Summing device 56 has a positive input connected to the output of hybrid 52, a negative input coupled to the output of echo canceler 54, and an output terminal for providing a receive signal labeled "RX". Echo canceler 54 must likewise cancel echo that is received along with the far-end signal.

Figure 3:
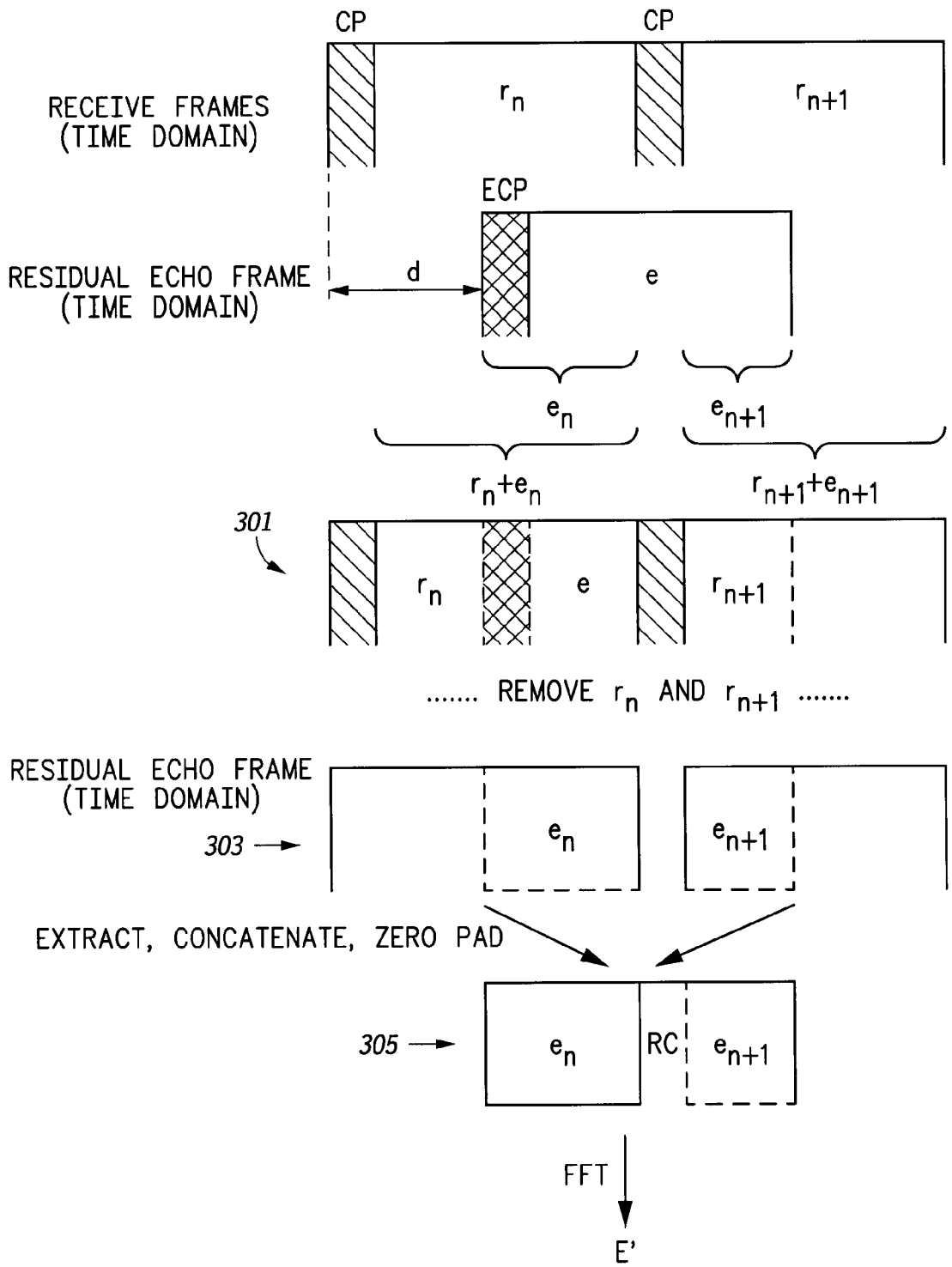
FIG. 3 is a figurative diagram illustrating a process in accordance with an embodiment of the present invention for extracting residual echo.

FIG. 3 illustrates, in figurative form, a process according to the present invention for extracting residual echo from consecutive transmission frames. Information is transmitted across the transmission line as a series of consecutive frames. An integer subscript "n" is used to denote a given frame, where "n+1" denotes the next consecutive frame. Shown are two receive frames $r_n$ and $r_{n+1}$, each with a corresponding cyclic prefix denoted "CP". The cyclic prefix CP is a guard band that is typically used in multicarrier transceiver systems, such as those systems using discrete multitone (DMT). As used herein, signal names and functions denoted using lower case letters are representations in the time domain whereas upper case letters denote the frequency domain, unless otherwise specified. This naming convention does not apply to signal prefixes CP, ECP or the replacment component (RC). Also coupled into the receive frames $r_n$ and $r_{n+1}$ is a residual echo frame, denoted e, having an echo cyclic prefix, denoted "ECP". The present invention may be applied to synchronous or asynchronous systems, i.e. the residual echo frame may or may not be synchronized with the receive frames depending on an arbitrary offset amount relative to the receive frame $r_n$, denoted "d". The value of d depends on the conditions and characteristics of the communication system, such as length of the transmission line, temperature and the like. The combined signal 301 present after the echo canceler's adder 401 includes the receive frames $r_n$ and $r_{n+1}$ plus the residual echo frame e. It is noted that the cyclic prefix CP, coincident with the residual echo frame, is considered lost samples and is unusable. This particular CP is thus stripped out and replaced by an arbitrary replacement component (RC), as described below.

In accordance with the present invention, the receive frames $r_n$ and $r_{n+1}$ are removed leaving residual echo components distributed across the two consecutive frames, denoted $e_n$ and $e_{n+1}$ as shown at 303. The time domain residual echo components $e_n$ and $e_{n+1}$ are extracted, concatenated together into a single frame 305, and the replacement component RC is inserted between the echo components to replace the unusable CP portion of the receive signal. In one embodiment, a zero pad device is used to insert zero values to replace the unusable portion that has been stripped. Zero values have been determined to perform well as the replacement component RC, although many suitable alternatives exist for use in the present invention. The result is transformed into the frequency domain using a Fast Fourier Transform (FFT) resulting in a frequency domain estimate of the residual echo, denoted E'. An apostrophe (') following a signal name denotes an estimate or an estimated value. The frequency domain estimate of the residual echo E' is used to adaptively update the Frequency Domain Echo Canceler (FREC) coefficients denoted W', which are frequency domain estimates of the echo channel transfer function, and thereby improve communication.

Figure 4:
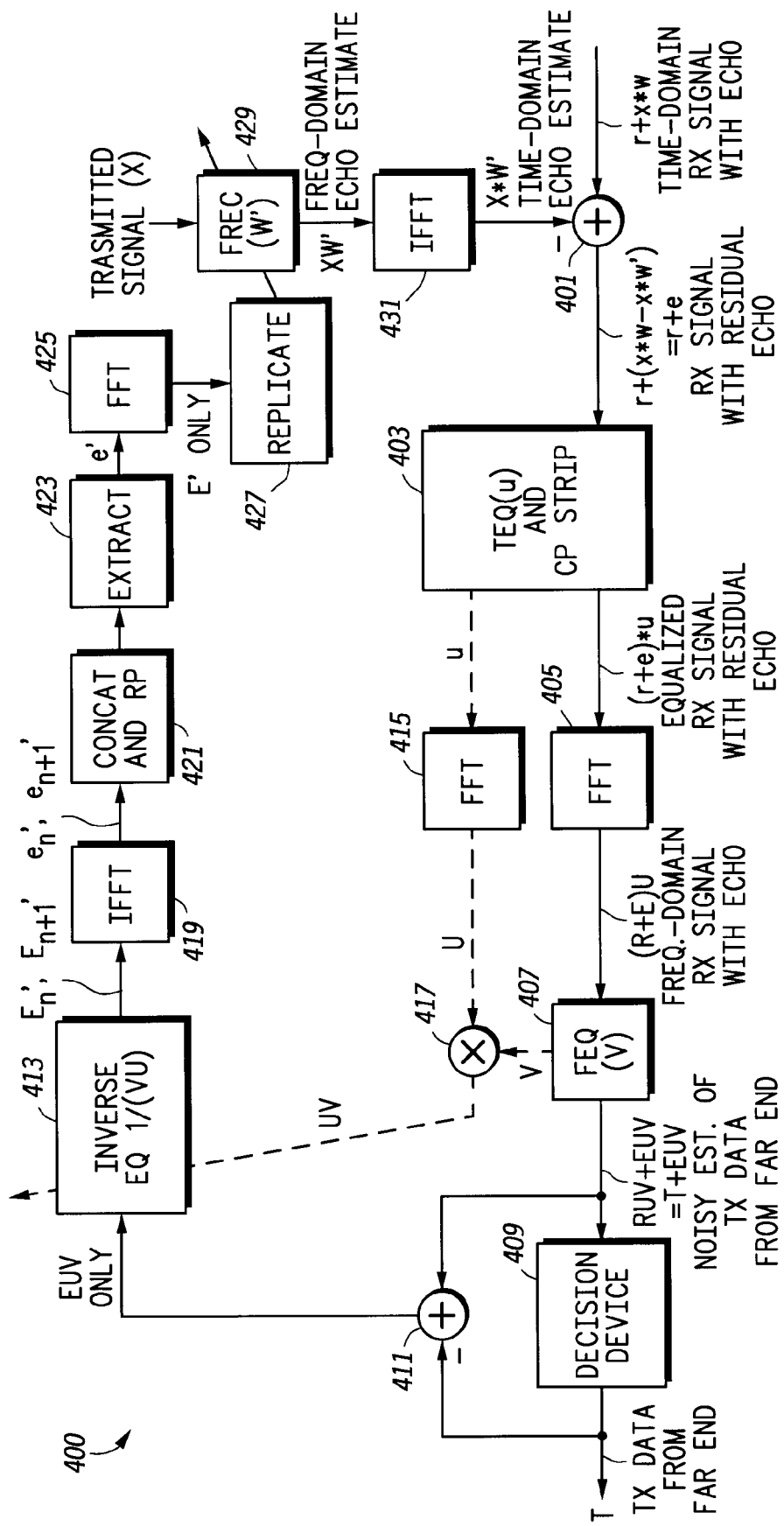
FIG. 4 illustrates, in block diagram form, an adaptive echo canceler according to the present invention.

FIG. 4 illustrates, in block diagram form, an exemplary echo canceler 400 according to an embodiment of the present invention that performs the process illustrated in FIG. 3. The echo canceler 400 may be used as either or both echo cancelers 34, 54. The echo canceler 400 includes a couple of adders 401 and 411, a time domain equalizer (TEQ) 403, several FFT devices 405, 415, and 425, a frequency domain equalizer (FEQ) 407, a decision device 409, an inverse equalizer (EQ) 413 for both frequency and time domain equalizers, a couple of inverse FFT devices (IFFTs) 419 and 431, a concatenation device 421, an extractor 423, a replicator 427, and a frequency domain echo canceler (FREC) 429. The adders 401 and 411 operate in a similar manner as the summing devices previously described, where 401 operates in the time domain and 411 operates in the frequency domain.

The FFTs 405, 415 and 425 convert signals from the time domain into corresponding signals in the frequency domain. The IFFTs 419 and 431 perform the opposite function of FFT by converting signals back to the time domain. The FFTs and IFFTs are conventional fast Fourier transform blocks that may be implemented using DSP techniques. The TEQ 403 is a time domain filter that corrects for inter-frame interference, where this function is generally referred to by the letter "u". The FEQ 407 is a frequency domain equalizer that removes the phase and magnitude distortion imparted by the channel, where this function is generally referred to by the letter "V". The decision device 409 produces an estimate of the far end transmit signal. The remaining devices and components will be described below.

A time domain input signal r+x*w incorporates the receive signal and the locally transmitted frame modified by the echo channel, where "x" represents the transmitted frame, "w" represents the echo channel transfer function caused by a hybrid device, such as hybrid 52 or hybrid 32, and asterisk (*) denotes convolution. The transmitted frame modified by the echo channel (x*w) is referred to as the "echo". Time domain echo estimate x*w' is received at one of the inputs to adder 401 and subtracted from the input signal r+x*w that is applied to the other input of adder 401 to result in the receive signal with residual echo, or r+(x*w−x*w'). The w' coefficients are the time domain FREC coefficients. The residual echo (x*w−x*w') is replaced with the letter "e". The receive signal with residual echo r+e is provided to an input of the TEQ 403. TEQ 403 has a first output which provides the FFT 405 with the equalized and cyclic-prefix stripped signal (r+e)*u. A second output of TEQ 403 provides FFT 415 with the time domain coefficients of function u. The output of FFT 405 is provided to an input of the FEQ 407, which has a first output coupled to the input of a decision device 409. Another output of the FEQ 407 provides frequency domain coefficients of function V to one input of a frequency domain multiplier 417. The other input of the multiplier 417 receives the output of the FFT 415. The output of the multiplier 417 is provided to the inverse equalizer 413 to modify its filter coefficients.

Decision device 409 estimates the transmitted data from the far end T. The transmitted data from the far end, denoted T, is provided to one input of the adder 411, which receives the output of the FEQ 407 at its other input. The adder 411 subtracts T from the output of the FEQ 407 and provides the difference to the input of the inverse EQ 413. The filter coefficients of the inverse equalizer 413 are modified by the output of the multiplier 417. The output of the inverse equalizer 413 is provided to the input of the IFFT 419, which provides its output to the concatenation device 421. The output of the concatenation device 421 is provided to the extractor 423, which provides its output to the FFT 425. The output of FFT 425 is provided to the replicator 427. The output of the replicator 427 is used to modify the coefficients of FREC 429 to calculate new values for the FREC coefficients W'. The FREC 429 multiplies the transmitted signal X with W' and provides its output (XW') to the input of the IFFT 431. The output of the IFFT 431 is provided to the negative input of the adder 401.

In operation, the output of IFFT 431 is a time domain echo estimate, denoted x*w' which is subtracted from the input signal r+x*w to arrive at a receive signal with residual echo r+e. In the embodiments shown, the TEQ 403 performs the time domain equalization function u and cyclic prefix stripping to provide an equalized receive signal with residual echo, denoted (r+e)*u, which is provided to the FFT 405. The time domain coefficients of the function u are provided to the FFT 415. It is noted that the particular TEQ configuration for the system described herein is only one of many possible configurations of a multicarrier transceiver system. For example, different configurations may omit the TEQ function altogether, or the TEQ function may be performed on the signal before entering the echo canceler 400, or TEQ may be replaced with an arbitrary filter. If not used, then the u function is effectively eliminated from the system.

The FFT 415 converts the coefficients of function u to a frequency domain representation of the function u, denoted "U", where the U coefficients are provided to the multiplier 417. The FFT 405 provides a frequency domain receive signal with echo, denoted (R+E)U, which is provided to FEQ 407. FEQ 407 performs the frequency domain equalization function V. The V function coefficients are provided to the multiplier 417. The multiplier 417 multiplies U times V to provide UV used to modify the coefficients of the inverse equalizer 413. The output of FEQ 407 provides a noisy estimate of the transmit data from the far end, denoted RUV+EUV, where T=RUV, and where EUV is a frequency domain representation of the residual echo modified by the U and V functions. The decision device 409 receives T+EUV and provides the transmit data from the far end T at its output. The adder 411 subtracts T from the output of FEQ 407 resulting in EUV. The inverse equalizer 413 is intended to perform the inverse function (1/UV) of the U and V functions to provide a frequency domain representation of the estimate of the residual echo during a first iteration of the process, denoted $E_n'$. For practical embodiments, the inverse 1/V function is accurately approximated and generally removes the V function. The inverse 1/U function is an approximation in the frequency domain of the inverse TEQ function, although other techniques are known but may be more computationally intensive. Such other techniques are contemplated herein but may result in additional cost of the overall system.

In another iteration of the process for a second consecutive frame, a subsequent frequency domain representation of the estimate of the residual echo is provided, denoted $E_{n+1}'$. $E_n'$ and $E_{n+1}'$ are provided to the IFFT 419 to convert to the time domain. The two time domain residual echo estimate components, $e_n'$ and $e_{n+1}'$ are concatenated by the concatenator device 421, which effectively outputs two frames with residual echo components within the consecutive frames. The concatenator device 421 also adds the replacement component RC between the estimate of the residual echo. The output of the concatenator device 421 is provided to the extractor 423, which extracts an estimate of the residual echo, denoted e', from the two sequential frames. The time domain estimate of the residual echo e' is provided to the FFT 425, which provides a frequency domain representation of the estimate of the residual echo denoted E'. Note that devices 421 and 423 can be logically interchanged in another embodiment. E' is provided to replicator 427 from the FFT 425. As described before, the output of replicator 427 is used to modify the W' coefficients of the FREC 429. Also, the FREC 429 multiplies the frequency domain transmitted signal X by W', where XW' is input to the IFFT 431. The output of the IFFT 431 provides the time domain echo estimate x*w', which is provided to the adder 401 as previously described.

Figure 5:
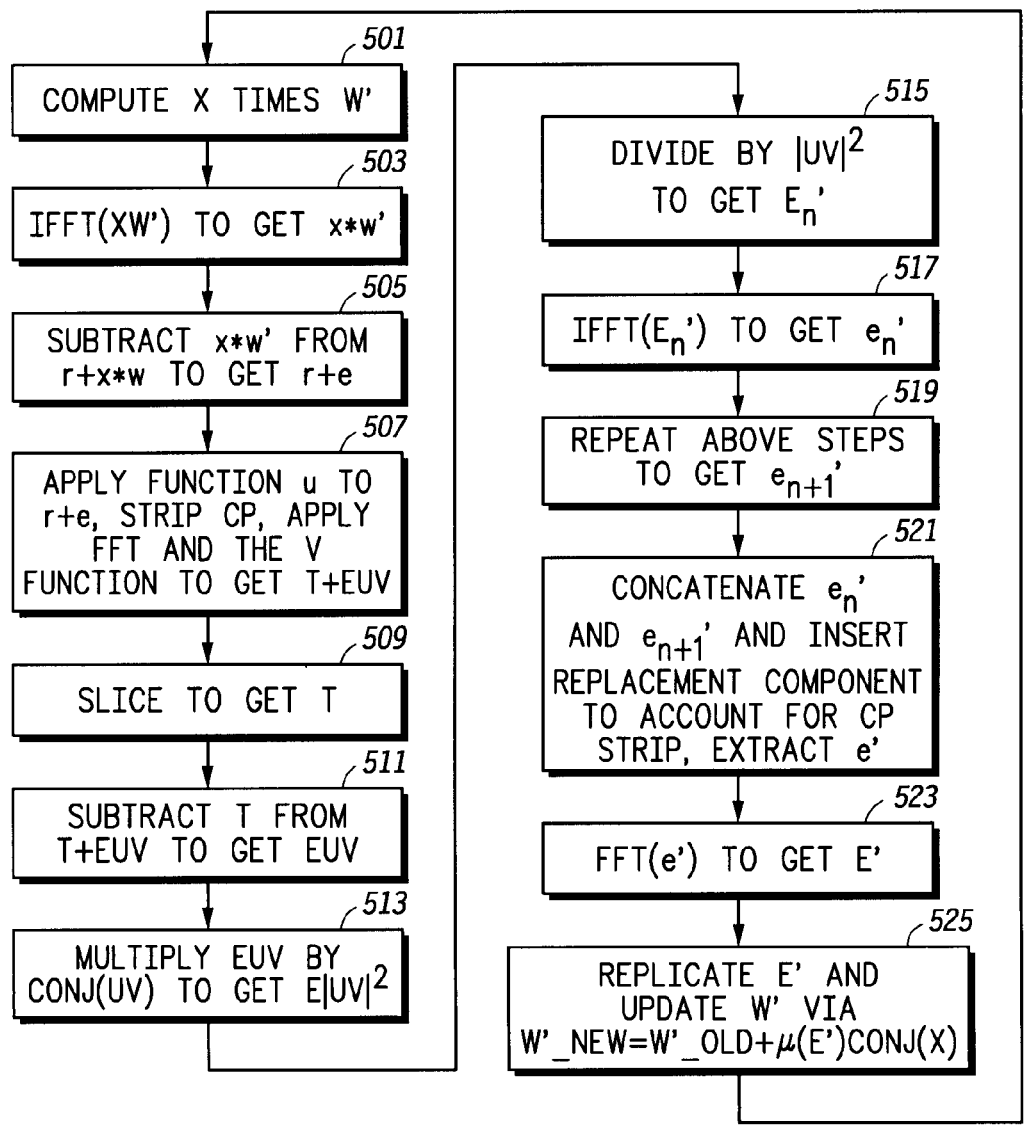
FIG. 5 illustrates, in flow diagram form, operation of the echo canceler of FIG. 4.

FIG. 5 illustrates, in flow diagram form, the operation of the echo canceler 400 of FIG. 4. At a first block 501, the transmitted signal in the frequency domain X is multiplied by the FREC coefficients W'. The result XW' is converted to the time domain resulting in x*w' at block 503. The adder 401 subtracts the result from block 503 from the input signal r+x*w, resulting in the receive signal with residual echo r+e at next block 505. At next block 507, function u is applied to the receive signal with residual echo and the cyclic prefix is stripped as well. The result is converted to the frequency domain using FFT. Function V is then applied to the frequency domain result, resulting in the data transmitted by the far end and the frequency domain representation of the residual echo modified by the U and V functions or T+EUV at block 507.

The result from block 507 is sliced by decision device 409 to estimate the data transmitted by the far end. At next block 511, T is subtracted from the T+EUV value provided by block 507 resulting in the frequency domain representation of the residual echo modified by the U and V functions, or EUV at block 511. The EUV output of block 511 is then multiplied by the complex conjugate (conj) of the function (UV) to retrieve the result $E|UV|^2$ at block 513, where $|UV|$ denotes the magnitude of UV.

The output of block 513 is divided by TV at block 515 to retrieve a frequency domain representation of an estimate of the residual echo for iteration or frame n, referred to as $E_n'$. In one embodiment, the division is approximated by nearest power of two (2) shift operation. At the next block 517, the inverse FFT is performed on the $E_n'$ output of block 515 to obtain the corresponding time domain version $e_n'$, as shown in block 517. The above steps 505–517 are repeated to retrieve the next consecutive time domain representation of the estimate of the residual echo, or $e_{n+1}$ at block 519. The output of block 519 for two consecutive iterations, or $e_n'$ and $e_{n+1}'$ are concatenated together and the replacement component RC is inserted to account for the CP being stripped at block 521. The result is also extracted into a single frame to achieve e'. The output e' of block 521 is applied to an FFT at block 523 to convert it to the frequency domain value E'.

At the next block 525, the E' output of block 523 is used to synthesize all frequency bands of the overall defined bandwidth for the echo path. The FREC coefficients W' are then updated according to the least mean squared (LMS) algorithm as shown at block 525 to a new value W'_new, which are the updated FREC coefficients W'. The prior value of W', referred to as W'_old is summed with a step size parameter "·" multiplied by the frequency domain representation of the estimated residual echo E' multiplied with the complex conjugate of the transmit signal in the frequency domain X according to the LMS equation W'_new=W'_old+·(E')conj (X). Operation then returns to block 501, where in the next iteration the frequency domain transmit signal, X, is multiplied by the new or updated echo channel coefficient W'. Operation repeats in this manner. It is noted that a memory stores the value $E_n'$ from the inverse equalizer 413 to be combined with the next value $E_{n+1}'$ for each iteration.

The use of an echo canceler in accordance with the present invention eliminates the dependence of the FREC coefficient updates on the receive signal. Instead, the FREC coefficient updates are made based on the residual echo alone making the communication system robust under different operating environments. The present invention applies to any multicarrier systems including full duplex DMT systems. Traditionally, the error signal included the residual echo signal mixed with the receive signal, which degraded system performance and the operation of echo cancellation.

The present invention provides a simple, fast and robust echo canceler update for both synchronous and asynchronous systems. By eliminating dependence on the receive signal for updating the FREC coefficients, the convergence is substantially faster and not dependent on the far end signal as in prior systems, and tracking speed is no longer a function of line attenuation. Furthermore, this method converges whether or not the receive signal has a non-zero mean value. Performance of the echo canceler is virtually independent of the receive signal and allows reliable tracking of changes in the echo channel over time. It is noted that the number of required operations is somewhat increased, but the increased processing is substantially outweighed by faster convergence. The present invention may be applied to traditional architectures by implementing the additional functions in firmware to enable reusability of the modules in existing systems. The present invention is as applicable to any wire-line communication device using DMT modulation, such as most DSL applications and multichannel infrastructure modems. The present invention enables longer reach, better performance and long term reliability.

While the invention has been described in the context of a preferred embodiment, it will be apparent to those skilled in the art that the present invention may be modified in numerous ways and may assume many embodiments other than that specifically set out and described above. For example, the echo canceler of the present invention may be implemented in hardware, in software running on a conventional digital signal processor or some combination thereof. Furthermore, the echo canceler of the present invention is applicable to other multicarrier systems besides the ADSL system described herein. Accordingly, it is intended by the appended claims to cover all modifications of the invention which fall within the true scope of the invention.

What is claimed is:

1. A method of canceling echo in a multicartier transceiver system including a multicarrier transmitter that transmits signals and a multicarrier receiver that receives signals, the method comprising:

separating a first residual time domain echo component $e_n$, from a combined first time domain receive signal $r_n$ and the first residual time domain echo component $e_n$;

separating a second residual time domain echo component $e_{n+1}$, from a combined second time domain receive signal $r_{n+1}$ and the second residual time domain echo component $e_{n+1}$; and combining the first residual time domain echo component en with the second residual time domain echo component $e_{n+1}$ to obtain a combined residual time domain echo component for adaptively updating a transfer function;

wherein the second time domain receive signal $r_{n+1}$ includes a guard band, the step of combining the first residual time domain echo component $e_n$ with the second, residual time domain echo component $e_{n+1}$ further comprising:

adding a replacement component to the residual time domain echo component e' for samples lost due to the guard band.

2. The method of canceling echo of claim 1, wherein the replacement component is comprised of zeros.

3. The method of canceling echo of claim 1, wherein the second residual time domain echo component $e_{n+1}$ is substantially a zero component, and wherein the combined residual time domain echo component is separated from the combined first time domain receive signal $r_n$ and first residual time domain echo component $e_n$.

4. A method of canceling echo in a multicarrier transceiver system including a multicarrier transmitter that transmits signals and a multicarrier receiver that receives signals, the method comprising:

removing a first receive signal r from a combined first residual echo component e and the first receive signal r of a first frame, to obtain a first residual echo component;

repeating the removing step for a second receive signal r and a second residual echo component e of a second consecutive frame to obtain a second residual echo component; and combining the first residual echo component with the second residual echo component to obtain a combined residual echo component for adaptively updating a transfer function.

5. The method of canceling echo of claim 4, wherein the second receive signal r includes a guard band, the step of combining further comprises:

adding a replacement component to the combined residual echo component for samples lost due to the guard band.

6. The method of canceling echo of claim 4, wherein the step of removing further comprises:

subtracting an estimated time domain echo signal x*w' from a time domain receive signal r and a time domain echo signal x*w to produce the time domain receive signal r' and a residual time domain echo component e;

producing a far end transmitted signal T added to 1 an equalized residual frequency domain echo component EUV from the time domain receive signal r and the residual time domain echo component e;

estimating the far end transmitted signal T;

subtracting the estimated far end transmitted signal T from the produced far end transmitted signal T added to the equalized residual frequency domain echo component EUV, to produce the equalized residual frequency domain echo component EUV independent of the far end transmitted signal T;

removing equalizer functions U and V from the equalized residual frequency domain echo component EUV to obtain a residual frequency domain echo component E';

converting the residual frequency domain echo component E' to obtain a residual time domain echo component e'.

7. The method of canceling echo of claim 4 wherein the step of combining further comprises:

concatenating the first residual echo component with the second residual echo component, wherein the first residual echo component and the second residual echo component are in the time domain; and extracting the first residual echo component from the first frame and the second residual echo component from the second consecutive frame to obtain the combined residual echo component.

8. The method of canceling echo of claim 5, wherein the step of combining further comprises:

concatenating the first residual echo component with the second residual echo component, wherein the first residual echo component and the second residual echo component are in the time domain; and extracting the first residual echo component from the first frame and the second residual echo component from the second consecutive frame to obtain the combined residual echo component.

9. The method of canceling echo of claim 6, wherein the step of producing the far end transmitted signal T added to the equalized residual frequency domain echo component EUV further comprises:

equalizing the time domain receive signal r and the residual time domain echo component e and stripping a cyclic prefix, to produce an equalized time domain component (r+e)*u;

converting the equalized time domain component (r+e)*u to a frequency domain component (R+E)U;

equalizing the frequency domain component (R+E)U to produce a far end transmitted signal T added to an equalized residual frequency domain echo component EUV.

10. The method of canceling echo of claim 6, wherein the step of removing the equalizer functions U and V from the equalized residual frequency domain echo component EUV further comprises:

converting time domain equalizer function coefficients u to the frequency domain equalizer function U; and multiplying the frequency domain equalizer function U with the frequency domain equalizer function V to produce frequency domain equalizer function UV, and removing any combination of the phase and magnitude of the frequency domain equalizer function UV.

11. The method of canceling echo of claim 10 wherein the step of removing the phase of the frequency domain equalizer function UV further comprises: multiplying the equalized residual frequency do main echo component EUV by the complex conjugate of the equalizer function UV to produce an equalized residual frequency domain echo component with a complex conjugate function $E|UV|^2$.

12. The method of canceling echo of claim 10, wherein the step of removing the magnitude of the frequency domain equalizer function W further comprises:

multiplying the equalizer function UV by the complex conjugate of the equalizer function UV to produce a square of the absolute value of the equalizer function $|UV|^2$; and approximating the division of the square of the absolute value of the equalizer function $|UV|^2$.

13. The method of canceling echo of claim 12, wherein the step of approximating the division of the square of the absolute value of the equalizer function $|UV|^2$ further comprises:

finding an integer power of two which approximates the square of the absolute value of the equalizer function $|UV|^2$; and shifting the equalized residual frequency domain echo component with a complex conjugate function $E|UV|^2$ by said integer power of two.

14. The method of canceling echo of claim 13, wherein the step of shifting by said integer power of two further includes incorporating the shift into a step size value $\mu$.

15. The method of canceling echo of claim 6, wherein the step of estimating the far end transmitted signal T is performed by a decision device.

16. A multicarrier transceiver system comprising:

an echo canceler responsive to a frequency domain transmit signal X and a time domain transmit signal x, and responsive to a receive signal r and an echo signal x*w, for generating a first residual echo component $e_n$ independent of the receive signal $r_n$ of a first frame and a second residual echo component en+, independent of the receive signal $r_{n+1}$ of a second consecutive frame, for producing a combined residual echo component $e_n$ with $e_{n+1}$;

a multicarrier transmitter that generates the frequency domain transmit signal X and the time domain transmit signal x, and an output transmit signal for communicating to the remote receiver through a data link, and a multicarrier receiver that is responsive to an input receive signal received from the remote transmitter through the data link, and adaptively responsive to the combined residual echo component $e_n$ with $e_{n+1}$ for generating the receive signal r.

17. The multicarrier transceiver system of claim 16, wherein the receive signal $r_{n+1}$ includes a guard band, and wherein the echo canceler generates a replacement component added to the combined residual echo component $e_n$ with $e_{n+1}$.

* * * * *

UNITED STATES PATENT AND TRADEMARK OFFICE
CERTIFICATE OF CORRECTION

PATENT NO. : 6,781,965 B1
APPLICATION NO. : 09/543866
DATED : April 5, 2000
INVENTOR(S) : Milos Milosevic et al.

It is certified that error appears in the above-identified patent and that said Letters Patent is hereby corrected as shown below:

In Column 8, Line 19, Claim 1,
  Change "multicartier" to -- multicarrier --.

In Column 8, Line 32, Claim 1,
  Change "en" to -- $e_n$ --.

In Column 8, Line 19, Claim 1,
  Delete "," after second.

Signed and Sealed this

Thirtieth Day of November, 2010

David J. Kappos
*Director of the United States Patent and Trademark Office*